US00RE37558E

(19) United States
(12) Reissued Patent
Abrams et al.

(10) Patent Number: US RE37,558 E
(45) **Date of Reissued Patent: *Feb. 26, 2002**

(54) PACKAGING ARRANGEMENT FOR CONTACT LENSES

(75) Inventors: Richard Wayne Abrams, Jacksonville, FL (US); Ture Kindt-Larsen, Holte (DK); Wallace Anthony Martin, Orange Park, FL (US)

(73) Assignee: Johnson & Johnson Vision Care, Inc., Jacksonville, FL (US)

( * ) Notice: This patent is subject to a terminal disclaimer.

(21) Appl. No.: 09/465,655

(22) Filed: Dec. 16, 1999

Related U.S. Patent Documents

Reissue of:
(64) Patent No.: 5,697,495
Issued: Dec. 16, 1997
Appl. No.: 08/257,796
Filed: Jun. 10, 1994

U.S. Applications:
( 63) Continuation-in-part of application No. 08/146,754, filed on Nov. 2, 1993, now abandoned.

(51) Int. Cl.[7] ..... A45C 11/04; B65D 21/02
(52) U.S. Cl. ..... 206/5.1; 134/901; 206/499; 206/576; 206/820
(58) Field of Search ..... 206/5.1, 461, 499, 206/526, 820; 134/901; D9/341, 415, 423; D3/264

(56) References Cited

U.S. PATENT DOCUMENTS

| | | | | | |
|---|---|---|---|---|---|
| 2,361,597 | A | * | 10/1944 | Buttery | |
| 2,887,389 | A | * | 5/1959 | Linville | 206/526 X |
| 2,917,216 | A | * | 12/1959 | Despres | 206/499 X |
| 3,394,717 | A | * | 7/1968 | Hollinger | 206/5.1 X |
| 3,414,117 | A | * | 12/1968 | Leeds | 206/5.1 X |
| 3,545,605 | A | * | 12/1970 | Robins | 206/361 X |
| 3,605,374 | A | * | 9/1971 | Mueller et al. | 206/820 X |
| 3,630,346 | A | * | 12/1971 | Burnside | 206/461 X |
| 3,715,856 | A | * | 2/1973 | Borel | 206/820 X |
| 3,780,918 | A | * | 12/1973 | Curtis | 206/5.1 |
| 3,872,966 | A | * | 3/1975 | Gordon et al. | 206/499 X |
| 3,910,487 | A | * | 10/1975 | Jaeschke | |
| 4,495,313 | A | * | 1/1985 | Larsen | |
| 4,565,348 | A | * | 1/1986 | Larsen | |
| 4,640,489 | A | * | 2/1987 | Larsen | |
| 4,680,336 | A | * | 7/1987 | Larsen et al. | |
| 4,691,820 | A | * | 9/1987 | Martinez | 206/5.1 X |
| D299,085 | S | * | 12/1988 | Martinez | D3/264 |
| 4,889,664 | A | * | 12/1989 | Kindt-Larsen et al. | |
| D305,478 | S | * | 1/1990 | Lohm et al. | D3/264 |
| 5,039,459 | A | * | 8/1991 | Kindt-Larsen et al. | |
| 5,054,610 | A | * | 10/1991 | Ajello | 206/5.1 |
| 5,080,839 | A | * | 1/1992 | Kindt-Larsen | |
| 5,094,609 | A | * | 3/1992 | Kindt-Larsen | |
| 5,337,888 | A | * | 8/1994 | Morrison | 206/5.1 |
| 5,467,868 | A | * | 11/1995 | Abrams et al. | 206/5.1 |

FOREIGN PATENT DOCUMENTS

| | | | |
|---|---|---|---|
| FR | 2310940 | * | 12/1976 |
| JP | 64-74525 | * | 3/1989 |

* cited by examiner

*Primary Examiner*—Bryon P. Gehman

(57) ABSTRACT

A packaging arrangement for the containment of at least one hydrophilic contact lens in a sterile aqueous solution. More specifically, pursuant to the packaging arrangement, a plurality of disposable hydrophilic contact lenses are contained in a specific number of individual packaging arrangements collectively housed in a box-like container or carton so as to provide a specified or essentially measured supply of contact lenses for use by a consumer over a predetermined period of time.

46 Claims, 2 Drawing Sheets

(AMENDED)

FIG. 5
(AMENDED)
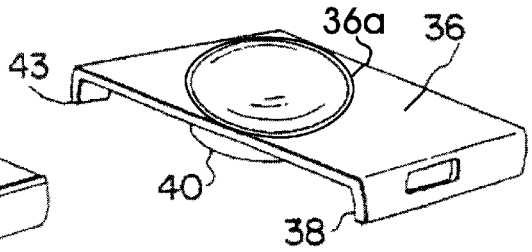
FIG. 7
(AMENDED)
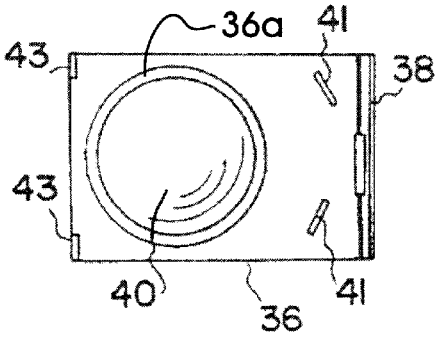
FIG. 6
(AMENDED)
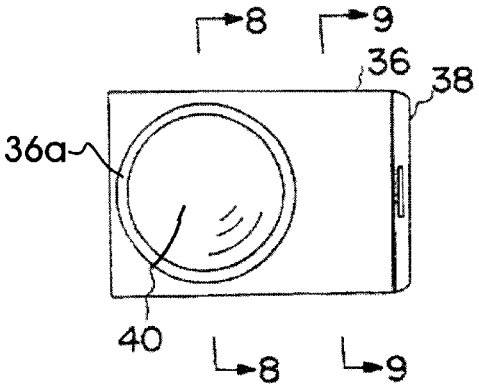
FIG. 8
(AMENDED)
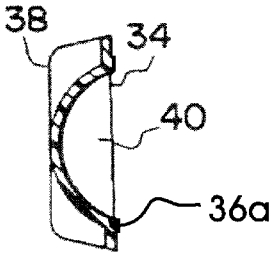

PACKAGING ARRANGEMENT FOR CONTACT LENSES

Matter enclosed in heavy brackets [ ] appears in the original patent but forms no part of this reissue specification; matter printed in italics indicates the additions made by reissue.

This application is a continuation-in-part patent application of U.S. Ser. No. 08/146,754, filed Nov. 2, 1993, now abandoned.

BACKGROUND OF THE INVENTION

1. Field of the Invention

The present invention relates to a packaging arrangement for the containment of at least one hydrophilic contact lens in a sterile aqueous solution. More specifically, the invention pertains to a packaging arrangement wherein a plurality of disposable hydrophilic contact lenses are contained in a specific number of individual packaging arrangements collectively housed in a box-like container or carton so as to provide a specified or essentially measured supply of contact lenses for use by a consumer over a predetermined period of time.

The packaging of hydrophilic contact lenses in a sterile aqueous solution is well known in the contact lens manufacturing technology. In particular, such packaging arrangements generally consist of so-called blister packages which are employed for the storage and dispensing of the hydrophilic contact lenses by a medical practitioner or to consumer who intends to wear the contact lenses. Generally, such hydrophilic contact lenses, which may be disposable after a single wear or short-term use, are manufactured from suitable hydrophilic polymeric materials. These materials may be, amongst others, copolymers of hydroxyethyl methacrylate containing from about 20% to 90% or more of water, depending upon the polymer composition. Generally, such contact lenses must be stored in a sterile aqueous solution, usually in isotonic saline solution in order to prevent dehydration and to maintain the lenses in a ready-to-wear condition.

2. Discussion of the Prior Art

Heretofore, contact lens manufacturers normally utilized stoppered glass bottles containing sterile saline solutions in which the hydrophilic contact lenses were immersed as storage and shipping containers for individual contact lenses. Each bottle was sealed with a suitable silicone stopper and provided with a metal closure as a safety seal in the configuration of an overcap. When the contact lens was intended to be removed from the bottle for use by a patient, the metal closure safety seal was required to be initially torn off the bottle, thereafter the stopper withdrawn and the lens lifted out from the bottle through the intermediary of a suitable plastic tweezer or pouring the contents out. This entailed the implementation of an extremely complicated procedure, since the contact lens was difficult to grasp and remove from the saline solution contained in the bottle due to the transparent nature of the contact lens which rendered it practically invisible to the human eye.

More recently, containments in the form of blister packages have been developed for hydrophilic contact lenses, and which enable the storage and shipping of the hydrophilic contact lenses in a simple and inexpensive expedient manner, while concurrently facilitating the conveniently easy removal of the contact lens by a practitioner or a patient.

For instance, a blister package which is adapted to provide a sterile sealed storage environment for a disposable or single-use hydrophilic contact lens, wherein the lens is immersed in a sterile aqueous solution; for example, such as in an isotonic saline solution, is described in U.S. Pat. No. 4,691,820 to Martinez; which is assigned to the common assignee for the present inventions and the disclosure of which is incorporated herein by reference.

Thus, in the above-mentioned U.S. patent, the blister package for storing and dispensing a hydrophilic contact lens includes an injection-molded or thermoformed plastic base portion incorporating a molded cavity which is surrounded by an outstanding planar flange about the rim of the cavity. A flexible cover sheet is adhered to the surface of the flange so as to sealingly enclose the cavity in a generally liquid-tight mode. Within the cavity of the base portion, a hydrophilic contact lens is immersed in a sterile aqueous solution, such as an isotonic saline solution. A portion of the side wall of the cavity is inclined to form a ramp extending upwardly towards the flange from the bottom of the cavity, and the cover sheet is adapted to be stripped from the flange in order to expose the cavity and inclined side wall whereupon the lens may be readily manually removed by being slid upwardly and out of the cavity along the inclined ramp surface of the cavity.

Although the foregoing blister package construction for the containment of contact lenses clearly provides a significant advance over prior structures requiring glass bottles and removable stopper arrangements for housing the contact lenses, the present invention further improves upon the uses and versatility of blister package construction in that the cavity is essentially of a semispherical configuration dimensioned so as to be adapted to closely support the contact lens therein immersed in an aqueous solution for ease of removal and also to facilitate an inspection process. Moreover, the foregoing construction primarily considers the utilization of such blister packages for the dispensing of individual contact lenses, with such blister packages being ordinarily separate or single packagings, which may then be housed in larger quantities in a further container, such as a rigid cardboard or paperboard carton of usual construction employed for the retail sales of the lenses.

Accordingly, it is an important aspect to be able to furnish a user of such disposable hydrophilic contact lenses with a specific supply of contact lenses, the latter of which are normally worn for only a single day; in essence, for ordinarily 8 to 18 hours within a 24-hour period and thereafter discarded. Hereby, the packaging of a supply of contact lenses should enable the user to store and provide indication for replenishing the supply of contact lenses at regular intervals; for example, at periods of 30 days. Consequently, the present invention contemplates the provision of packaging arrangements for specified quantities of such hydrophilic contact lenses, wherein these packaging arrangements are boxed in a carton enabling a rapid and precise determination as to the quantity of hydrophilic contact lenses contained therein, and with such packaging arrangements being of a compact nature which is completely protective of the hydrophilic lenses.

SUMMARY OF THE INVENTION

In essence, the inventive concept pertains to packaging arrangements in which a plurality of blister packages each having a semi-circular cavity containing respectively one hydrophilic contact lens in a sterile aqueous solution. A specified quantity of such blister packages has molded plastic base members thereof each containing a contact leans positioned in a contiguous array, and is covered by a single flexible cover sheet constituted of a laminated foil or silicon oxide, or other suitable material structure to provide a sealed environment for each of the contact lenses contained in the cavity formed in each base member. Weakening lines are formed in the flexible cover sheet intermediate adjoining base members to enable detachment from the array of individual blister packages containing one of the hydrophilic contact lenses as may be required by a user. In particular, a plurality of such arrays of continuous packaging arrangements for contact lenses, which arrays are in an interconnected planar form, are adapted to be arranged superimposed in a generally rectangular carton. Each successively superimposed array is inverted and rotationally reversed relative to a preceding underlying array so as to enable the respective arrays to be interleaved and compactly support each other. The cavities containing the contact lenses of a superimposed array are arranged inverted relative to the cavities of an array of blister packages located therebeneath or thereabove, such that the mutually inverted cavities will be positioned adjacent to cavities of a superimposed array in an interleaved compact arrangement at minimum spacial requirements. Consequently, a plurality of planar arrays of blister packages which are each respectively interconnected by a single flexible cover sheet for each array are in a superimposed contacting relationship within a substantially rigid rectangular carton, with such arrays containing a specific quantity of disposable hydrophilic contact lenses to furnish a user with a desired supply; for instance, thirty (30) hydrophilic contact lenses in six superimposed arrays of five blister packages each; in essence, a thirty-day supply of contact lenses.

Each of the blister package base members which has a rectangular outstanding planar flange encompassing a respective cavity therein, the latter of which is offset towards one edge, includes a depending wall portion formed at the opposite edge of the flange so as to provide a support for a superimposed or therebeneath located array of blister packages, thereby formulating rigidly supported and compact packaging arrangements within the carton, in which the cavities containing the hydrophilic contact lenses of superimposed arrays are substantially protected against potentially damaging external influences, such as shocks or impacts which may be imparted to the filled carton during handling thereof.

Each molded plastic base member of a blister package may be constituted from a suitable injection molded or thermoformed thermoplastic sheet material, such as a polyolefin, for instance polypropylene; whereas the flexible cover sheet may be constituted of a laminate of a polypropylene film and aluminum foil or a layer of silicon oxide, suitably imprinted and which is adapted to be heat-sealed to the flange extending about the cavity of the package containing the hydrophilic contact lens. The flexible cover sheet may be of a construction and imprinted in a novel manner as disclosed in copending U.S. patent application Ser. No. 08/106,386; filed on Aug. 13, 1993; entitled "Method of Double-Sided Printing of a Laminate and Product Obtained Thereby", commonly assigned to the assignee of the present application and the disclosure of which is incorporated herein by reference.

Accordingly, it is an object of the present invention to provide a packaging arrangement for hydrophilic contact lenses, wherein a plurality of lenses are located in base members of blister packages which are interconnected by a common flexible cover sheet to form an array of such packages.

A more specific object of the invention is to provide a packaging arrangement for a plurality of hydrophilic contact lenses in which a plurality of blister packages each having a cavity containing one of the contact lenses in a sterile aqueous solution are interconnected in an array by a single flexible cover sheet containing weakening lines intermediate the base members of the packages enabling separation of individual of the blister packages from the array for dispensing the contact lens from the separated package.

Another object of the present invention is to provide an arrangement for the storage of a plurality of superimposed arrays of blister packages within a substantially rigid carton structure.

Yet another object of the present invention is to provide structure for blister packages of the type described for the storage of hydrophilic contact lenses in a sterile aqueous environment, wherein pluralities of arrays of blister packages are arranged in specified mutually inverted superimposed relationship with a carton, and incorporate integrally formed supporting structure so as to be compactly and protectively supported within the carton.

BRIEF DESCRIPTION OF THE DRAWINGS

Reference may now be had to the following detailed description of a preferred embodiment of a packaging arrangement for contact lenses which is constructed pursuant to the invention, taken in conjunction with the accompanying drawings, in which:

FIG. 5 illustrates the base member of the blister package of FIG. 4 with the sealing cover sheet of the package having been stripped off so as to facilitate access to a contact lens contained in a cavity formed in the base member of the blister package;

FIG. 6 illustrates a top plan view of the base member of the blister package shown in FIG. 5;

FIG. 7 illustrates a bottom plan view of the base member of the blister package of FIG. 5;

FIG. 8 illustrates a sectional view taken along line 8—8 in FIG. 6.

DETAILED DESCRIPTION OF A PREFERRED EMBODIMENT

Figure 1:
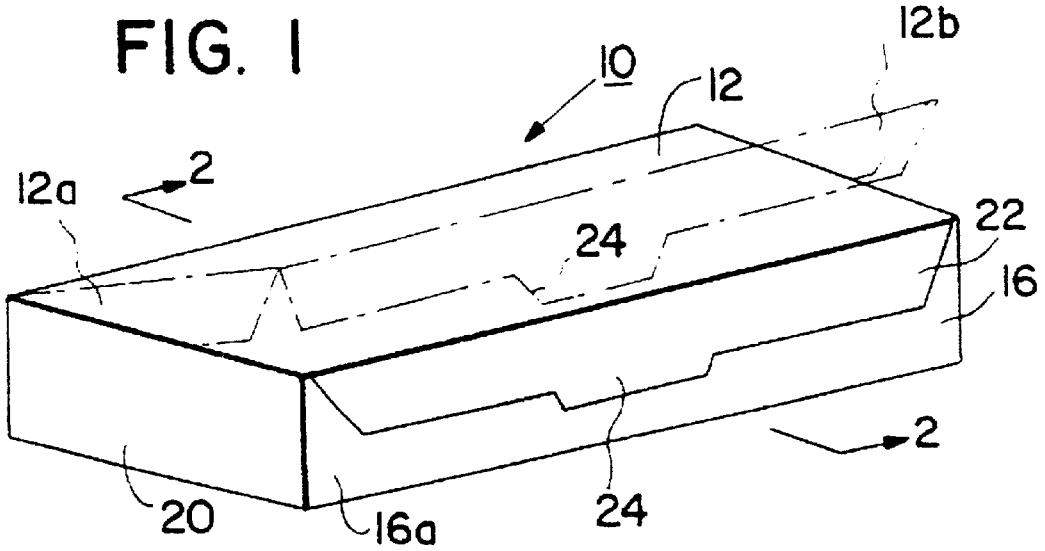
FIG. 1 illustrates a perspective view of a rectangularly-shaped carton for the containment of a plurality of superimposed arrays of packaging arrangements for a specific quantity of contact lenses.

Referring now in more specific detail to the drawings, and in particular to FIGS. 1 and 2, there is illustrated a generally rectangular carton 10 which is adapted to receive a plurality of planar arrays of packaging arrangements for the sealed containment of contact lenses, especially disposable hydrophilic contact lenses, as described in more specific detail hereinbelow.

The rectangular carton 10, which is preferably constituted of paperboard, includes flat top and bottom wall panels 12 and 14, and front and rear walls or panels 16 and, respectively, 18 which are adapted to be closed by being folded from a carton blank along suitable fold lines, and opposite ends 20; (only one shown) through an adhesive or glued construction as is known in the carton forming technology. The top wall panel 12 is adapted to be swung upwardly about a rear hinge line, as shown by the phantom illustration, to open the carton 10, and includes side flaps 12*a,* 12*b* which may be tucked within the confines of the carton beneath the end walls 20. The front wall panel 16 includes a lower portion 16*a* which is adapted to be glued to the end walls 20 by means of end flaps (not shown). The upper wall panel 12 includes a downwardly depending front flap 22 having a centrally located latching tab 24 at a lower edge thereof which is adapted to be tucked into a cooperating latching slit 26 centrally formed in the lower front wall panel 16 to facilitate reclosing of the carton, as shown in FIG. 2.

The carton 10, as is known in the art, may be equipped with a decorative glossy or semi-glossy exterior surface, which may be imparted with suitable single or multi-colored imprinting and/or embossing representative of the product contained therein, identifying legends and logos pertaining to the company manufacturing and/or marketing the product, instructions pertaining to the use of the product packaged in the carton, and other suitable legends, decorative indicia and the like.

Figure 3:
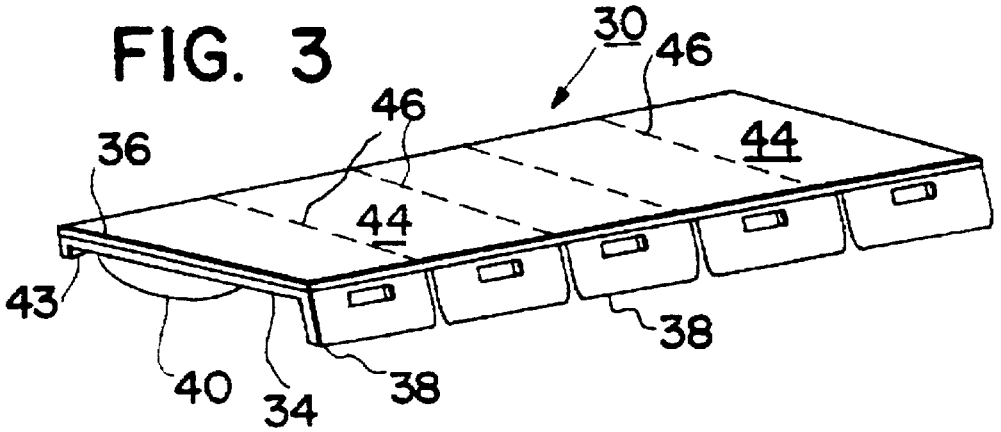
FIG. 3 illustrates a single array of a plurality of detachably interconnected blister packages each containing respectively one contact lens immersed in a sterile aqueous solution.

Within the carton 10 there is adapted to be housed a plurality of arrays of packaging arrangements 30, as is more specifically illustrated in FIG. 3 of the drawings, and which essentially represent the inventive concept for the packaging of desired quantities of individually dispensable contact lenses.

In essence, FIG. 3 illustrates the array of packaging arrangements 30 as consisting of a plurality of interconnected blister packages 32, wherein each blister package 32, as represented in further detail in FIGS. 4 through 9 of the drawings, includes a base member 34 consisting of a planar essentially rectangularly-shaped flange 36 having an integral depending wall portion 38 at one edge thereof. Offset towards an opposite edge 39 of the flange 36 a cavity 40 is formed therein which is of an essentially semispherical configuration, generally in conformance with the curvilinear shape of a contact lens (not shown), adapted to be stored therein in a sealed condition while immersed in a suitable sterile aqueous solution. However, other cavity configurations also readily lend themselves to the invention, such as semispherical, oval, or the like. The height of the wall portion 38 depending from the planar flange 36 is somewhat analogous to the height or depth of the cavity 40 containing the contact lens, as can be ascertained more clearly from FIGS. 2 and 8 of the drawings. Formed in the surface of the flange 36 proximate the depending wall portion 38 are a plurality of generally "chevron-shaped" raised ridges 41 which will assist in supporting the cavity structure of a superimposed inverted blister package 32 when positioned in the carton 10. Similarly the edge of the flange 36 opposite that possessing the depending wall portion is also provided with depending protuberances 43 which will also aid in positioning the blister packages in the carton, as described in detail hereinbelow.

The base member 34 of each so-called blister package is constituted from an injection-molded or thermoformed plastic sheet material; for instance, such as polypropylene, in a manner similar to that described in U.S. Pat. No. 4,691,820 to Martinez; which is assigned to the common assignee of the present application, and the disclosure of which is incorporated herein by reference.

Figure 4:
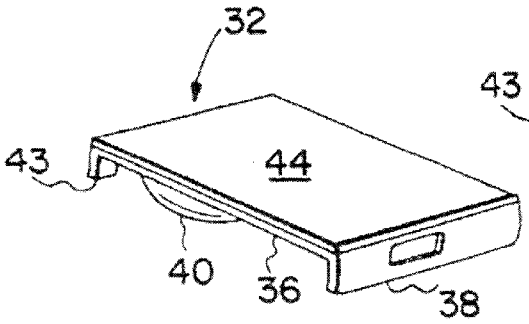
FIG. 4 illustrates a perspective view of one of the blister packages shown as having been separated from the array of FIG. 3.
Figure 9:
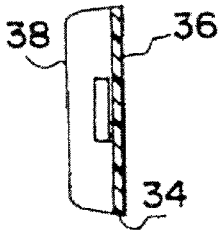
FIG. 9 illustrates a sectional view taken along line 9—9 in FIG. 6.

Positioned to extend over the base members 34 of a plurality of blister packages 32, in this case forming an array of five (5), is a continuous flexible cover sheet 44, as shown in FIG. 3, having a series of parallel spaced weakening lines 46, such as perforations, discontinuous slits or the like, provided between each of the adjacently located base members 34, to enable suitable detachment from the array of individual or single blister packages 32 each containing a single contact lens, as shown in FIG. 4, in accordance with the need of a user. The flexible cover sheet 44 is adhesively fastened to suitable regions of the surface of the flanges 36 facing the cover sheet, such as by heat sealing, ultrasonic sealing, adhesives or other acceptable methods, so as to at least encompass each cavity 40 containing a contact lens immersed in the sterile aqueous solution, and to provide a sealing containment for each contact lens in its respective cavity. Other sealing locations may also be provided at locations as desired between the surface of the flexible cover sheet 44 facing the surface of the flange 36 so as to provide adequate regions of adherence therewith, while permitting various edge portions between these components 36, 44 to remain unattached to facilitate a finger-gripping engagement for separating the severed cover sheet portion from the detached base member 34 in order to gain access to the contact lens which is contained in the applicable cavity 40 thereof.

*The flexible cover sheet 44 is sealed to the seal area 36(a) on the surface of flange 36. In the preferred embodiment of the invention, illustrated in FIGS. 5–8, the seal area 36(a) is raised and encompasses a peripheral edge of the cavity 40 as shown in FIGS. 6 and 7.*

The flexible cover sheet 44 is preferably constituted of a laminated foil, silicon oxide or other suitable material structure possessing a polypropylene film, or possibly a PET film, on at least one external surface thereof adapted to contact the facing surface of the flange 36 so as to enable adhesive or heat-sealing therewith, as mentioned hereinabove. The laminated foil constituting the flexible cover sheet 32 may be of a multi-layered construction having suitable double-sided imprinting provided thereon, for example, as disclosed in copending U.S. patent application Ser. No. 08/106,386.

As disclosed herein, the inventive packaging arrangement is adapted to provide for a packaged supply of disposable hydrophilic contact lenses, each of which is intended to be used for only one day and then discarded, for a period of 30 days; in effect, requiring the carton 10 to be able to store 30 contact lenses, each in a sterile sealed condition, in each one of the cavities of the blister packages 32 so as to be individually dispensable.

Hereby, as shown in FIG. 3, an array of blister packages 30 includes five base members 34, each having respectively one cavity 40 containing a single contact lens, the base members 34 being collectively covered and sealingly contacted by the single continuous flexible cover sheet 44, with the latter scored along the spaced weakening lines 46 to enable sequential separation of the array into five individual blister packages 32, as required by the needs of a user of the contact lenses.

Figure 2:
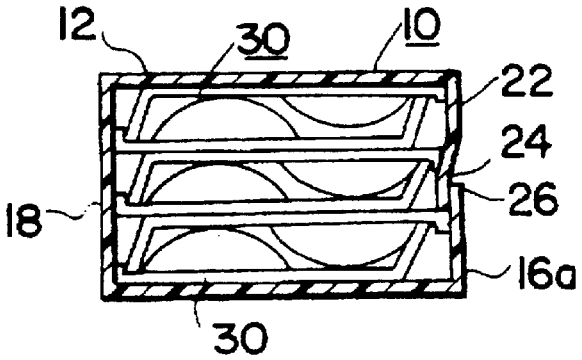
FIG. 2 illustrates a sectional view taken along line 2—2 in FIG. 1.

In order to provide for the compact and protective housing within the carton 10 of the thirty (30) blister packages 32 each containing a single contact lens within a respective sealed cavity 40, as can be ascertained from FIG. 2 of the drawings, six arrays 30 each respectively consisting five blister packages 32 joined by a common cover sheet 44, are superimposed in mutually inverted and reversed nesting positions such that the cavities 40 of an array 30 are adjacent to the cavities 40 of an inverted array 30 located therebeneath or thereabove, as may be the case. The upstanding end wall 38 of the flange 36 of each base member 34 of the blister packages 32, in cooperation with the depending end wall 38 of a therewith nested inverted array 30, as shown in FIG. 2, will form a support structure which is protective of the cavities 40 containing the contact lenses. Assisting this supportive and protective effect are the raised "chevron-shaped" ridges 41 which contact and contribute to the positioning in place of the cavities 40 of superimposed blister packages 32 adjacent the cavities of the arrays 30 beneath or above they are located. Similarly, the locating of the protuberances 43 of the flanges 36 adjacent to the depending wall portions 38 of superimposed or therebeneath located arrays of blister packages will also inhibit lateral displacements between the arrays. This arrangement of the arrays 30, in conjunction with the enclosing wall structure of the carton 10, provides for a compact and highly protective positioning of the various arrays 30 of contact lenses in their packaging arrangements within the carton 10.

In order to ensure that there is encountered only a minimal limited displacement and internal shifting of the contents of the carton, the preferable external peripheral rectangular dimensions of each array 30 of five blister packages are configure to be in close conformance with the internal rectangular dimensions or space within the carton 10 such that the front and end wall panels 16, 18, the end wall panels 20 and the top and bottom walls 12 and 14 of the carton 10 provide additional supporting structure maintaining the arrays 30 of blister packages in generally fixed and stationary positions within the carton, even upon successive withdrawals of individual of the blister packages 32 over a period of time by a practitioner or user of the contact lenses.

From the foregoing, it becomes readily apparent to one of skill in the art that the present invention provides for a simple packaging of predetermined quantities of blister packages provided in packaging arrangements and units adapted to be compactly stored within a carton in superimposed relationship which not only provides for a novel packaging but for added support and protection for each of the blister packages and the contact lenses contained in the cavities thereof.

Although the foregoing has been described with arrays 30 providing for collectively thirty contact lenses, other quantities may be considered to fall within the purview of the invention; i.e. such as 5, 10, 15, 20, or other numbers of packaging arrangements.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A packaging arrangement for the sealed containment of at least one hydrophilic contact lens in a sterile aqueous solution, comprising:

a) at least one molded plastic base member having a cavity for containing a contact lens immersed in a solution, each said base member including a flange extending outwardly about the periphery of said cavity, and a depending wall portion extending from said flange, said cavity consisting of a generally curvilinear concave indentation in each said base member and having a shape in substantial conformance with the shape of the contact lens adapted to be contained therein; and b) a flexible cover sheet superimposed over each said base member and dimensioned to be detachably sealed to a raised seal area on the surface of said flange, said flange having a generally planar surface facing said superimposed cover sheet in contacting relationship, said flange having said depending wall portion at one end of said planar surface extending in a direction away from said superimposed cover sheet, said cover sheet sealingly extending about said cavity and having unsealed edge portions providing gripping means engageable in cooperation with gripping of said wall portion for enabling separating said cover sheet from said flange so as to expose said cavity and facilitating external access to the contact lens; and protuberances being formed on an end of said flange opposite the end having said depending wall portion, said protuberances extending in generally the direction away from said superimposed cover sheet.

2. A packaging arrangement as claimed in claim 1, wherein a plurality of said base members are contiguously arranged and interconnected in an array by a said flexible cover sheet for the containment of a specified number of contact lenses arranged one each in each cavity of each of said base members.

3. A packaging arrangement as claimed in claim 2, wherein a single sheet of said flexible cover sheet extends over said plurality of base members and is sealingly connected to each said flange of respectively each said base member.

4. A packaging arrangement as claimed in claim 3, wherein said flexible cover sheet connects said plurality of base members in a coplanar array.

5. A packaging arrangement as claimed in claim 3, wherein weakening lines are formed in said flexible cover sheet intermediate each of said base members to enable separating said plurality of base members into individual packaging arrangements each having a single base member.

6. A packaging arrangement as claimed in claim 5, wherein said weakening lines in said flexible cover sheet comprise perforations extending at least partially through said cover sheet.

7. A packaging arrangement as claimed in claim 2, wherein said plurality of base members are separable into individual blister packages each containing a single contact lens.

8. A packaging arrangement as claimed in claim 2, wherein said array of base members comprises linearly arranged base members, said flexible cover sheet having a substantially rectangular configuration.

9. A packaging arrangement as claimed in claim 2, wherein a generally rigid self-supporting carton comprises a containment for a plurality of said arrays.

10. A packaging arrangement as claimed in claim 2, wherein a plurality of said packaging arrays are arranged in a generally rigid self-supporting carton in superimposed mutually inverted nested relationships.

11. A packaging arrangement as claimed in claim 10, wherein each cavity of each said molded plastic base member is offset towards one edge of said flange, said superimposed arrays being inverted with respect to the orientation of each said array to enable the compact nested positioning thereof within said carton.

12. A packaging arrangement as claimed in claim 11, wherein each said flange has a rectangular configuration comprising a depending wall portion which is located along an edge distant from the edge towards which each said cavity is offset, said depending wall portion being of a height substantially commensurate with the height of an indentation in each base member forming each cavity.

13. A packaging arrangement as claimed in claim 12, wherein said carton has a generally rectangular configuration.

14. A packaging arrangement as claimed in claim 13, wherein said carton comprises front and back wall panels, top and bottom wall panels connected to said front and back wall panels, and end wall panels and flap structure being fastened to respectively each other and to said front, back, top and bottom wall panels to form a closed carton structure, said front wall panel and top wall panel including openable upper and lower flap portions to enable opening said carton and mutually cooperable latching structure for relatching said carton in a closed position.

15. A packaging arrangement as claimed in claim 10, wherein said carton is constituted of paperboard.

16. A packaging arrangement as claimed in claim 15, wherein indicia and content-identifying legends are imprinted on at least one of the exterior surfaces of said carton.

17. A packaging arrangement as claimed in claim 1, wherein said flange is rectangular and said depending wall portion is integrally formed with said flange at one end edge of said flange.

18. A packaging arrangement as claimed in claim 1, wherein a seal is formed between said cover sheet and the planar surface of said flange sealingly encompassing the peripheral edge of said cavity.

19. A packaging arrangement as claimed in claim 1, wherein said seal comprises a heat seal.

20. A packaging arrangement as claimed in claim 1, wherein said molded plastic base member is constituted of a thermoformable polymer material.

21. A packaging arrangement as claimed in claim 1, wherein said flexible cover sheet is a multi-layered laminate having an outer layer of said laminate consisting of a polypropylene film contacting the surface of the flange of said molded plastic base member.

22. A packaging arrangement as claimed in claim 21, wherein said polypropylene film is heat sealed to said flange surface of the molded plastic base member for sealing the cavity containing the contact lens.

23. A packaging arrangement as claimed in claim 21, wherein said flexible cover sheet comprises a foil laminate.

24. A packaging arrangement as claimed in claim 21, wherein said flexible cover sheet comprises a silicon oxide barrier layer intermediate said outer plastic film layers.

25. A packaging arrangement as claimed in claim 1, wherein said molded plastic base member and said flexible cover conjointly form a moisture and vapor-imperviously sealed containment for said contact lens in said cavity.

26. A packaging arrangement as claimed in claim 1, wherein raised ridges are formed in the surface of said flange opposite said planar surface proximate said depending wall portion.

27. A packaging arrangement as claimed in claim 26, wherein said ridges comprise a plurality of spaced chevron-shaped ridges.

*28. A packaging arrangement for the sealed containment of at least one hydrophilic contact lens in a sterile aqueous solution; comprising:*

(*a*) *at least one molded plastic base member having a cavity for containing a contact lens immersed in a solution, each said base member including a flange extending outwardly about the periphery of said cavity, and a depending wall portion extending from said flange, said cavity consisting of a generally curvilinear concave indentation in each said base member and having a shape in substantial conformance with the shape of the contact lens adapted to be contained therein; and*

(*b*) *a flexible cover sheet superimposed over each said base member and dimensioned to be detachably sealed to a seal area on the surface of said flange, said flange having a generally planar surface facing said superimposed cover sheet in contacting relationship, said flange having said depending wall portion at one end of said planar surface extending in a direction away from said superimposed cover sheet, said cover sheet sealingly extending about said cavity and having unsealed edge portions providing gripping means engageable in cooperation with gripping of said wall portion for enabling separating said cover sheet from said flange so as to expose said cavity and facilitating external access to the contact lens; and protuberances being formed on an end of said flange opposite the end having said depending wall portion, said protuberances extending in generally the direction away from said superimposed cover sheet.*

*29. A packaging arrangement as claimed in claim 28, wherein a plurality of said base members are contiguously arranged and interconnected in an array by a said flexible cover sheet for the containment of a specified number of contact lenses arranged one each in each cavity of each of said base members.*

*30. A packaging arrangement as claimed in claim 29, wherein a single sheet of said flexible cover sheet extends over said plurality of base members and is sealingly connected to each said flange of respectively each said base member.*

*31. A packaging arrangement as claimed in claim 30, wherein said flexible cover sheet connects said plurality of base members in a coplanar array.*

*32. A packaging arrangement as claimed in claim 30, wherein weakening lines are formed in said flexible cover sheet intermediate each of said base members to enable separating said plurality of base members into individual packaging arrangements each having a single base member.*

*33. A packaging arrangement as claimed in claim 32, wherein said weakening lines in said flexible cover sheet comprise perforations extending at least partially through said cover sheet.*

*34. A packaging arrangement as claimed in claim 29, wherein said plurality of base members are separable into individual blister packages each containing a single contact lens.*

*35. A packaging arrangement as claimed in claim 28, wherein a seal is formed between said cover sheet and the planar surface of said flange sealingly encompassing the peripheral edge of said cavity.*

*36. A packaging arrangement as claimed in claim 28, wherein said seal comprises a heat seal.*

*37. A packaging arrangement as claimed in claim 28, wherein said molded plastic base member is constituted of a thermoformable polymer material.*

*38. A packaging arrangement as claimed in claim 28, wherein said flexible cover sheet is a multi-layered laminate having an outer layer of said laminate consisting of a polypropylene film contacting the surface of the flange of said molded plastic base member.*

*39. A packaging arrangement as claimed in claim 38, wherein said polypropylene film is heat sealed to said flange surface of the molded plastic base member for sealing the cavity containing the contact lens.*

*40. A packaging arrangement as claimed in claim 38, wherein said flexible cover sheet comprises a foil laminate.*

*41. A packaging arrangement as claimed in claim 38, wherein said flexible cover sheet comprises a silicon oxide barrier layer intermediate said outer plastic film layers.*

*42. A packaging arrangement as claimed in claim 28, wherein said molded plastic base member and said flexible cover conjointly form a moisture and vapor-imperviously sealed containment for said contact lens in said cavity.*

*43. A packaging arrangement as claimed in claim 29, wherein a generally rigid self-supporting carton comprises a containment for a plurality of said arrays.*

*44. A packaging arrangement as claimed in claim 43, wherein said carton has a generally rectangular configuration.*

*45. A packaging arrangement as claimed in claim 43, wherein said carton is constituted of paperboard.*

*46. A packaging arrangement as claimed in claim 45, wherein indicia and content-identifying legends are imprinted on at least one of the exterior surfaces of said carton.*

* * * * *